United States Patent
Akutsu et al.

(10) Patent No.: US 12,431,576 B2
(45) Date of Patent: Sep. 30, 2025

(54) BATTERY MODULE

(71) Applicant: HONDA MOTOR CO., LTD., Tokyo (JP)

(72) Inventors: Shigemitsu Akutsu, Saitama (JP); Shinji Fujimoto, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 505 days.

(21) Appl. No.: 17/822,132

(22) Filed: Aug. 25, 2022

(65) Prior Publication Data

US 2023/0113935 A1    Apr. 13, 2023

(30) Foreign Application Priority Data

Oct. 1, 2021   (JP) .................................. 2021-162748

(51) Int. Cl.
| | |
|---|---|
| *H01M 10/04* | (2006.01) |
| *H01M 50/258* | (2021.01) |
| *H01M 50/262* | (2021.01) |
| *H01M 50/264* | (2021.01) |

(52) U.S. Cl.
CPC ..... *H01M 50/262* (2021.01); *H01M 10/0481* (2013.01); *H01M 50/258* (2021.01); *H01M 50/264* (2021.01)

(58) Field of Classification Search
CPC ........................ H01M 10/0481; H01M 50/264
See application file for complete search history.

(56) References Cited

U.S. PATENT DOCUMENTS

| | | | |
|---|---|---|---|
| 2008/0090137 A1* | 4/2008 | Buck | H01M 50/503 |
| | | | 429/153 |
| 2018/0287111 A1 | 10/2018 | Fukuoka et al. | |
| 2019/0296289 A1* | 9/2019 | Yamamoto | H01M 50/55 |
| 2020/0106065 A1 | 4/2020 | Ito | |

FOREIGN PATENT DOCUMENTS

| | | | | |
|---|---|---|---|---|
| CN | 108352470 A | | 7/2018 | |
| JP | 2019169453 A | | 10/2019 | |
| JP | 2019220419 A | | 12/2019 | |
| JP | 2020057520 A | | 4/2020 | |
| KR | 1020180106421 A | * | 10/2018 | ........ H01M 10/0525 |
| KR | 1020201110046 A | * | 9/2021 | |
| WO | 2021172590 A1 | | 9/2021 | |

OTHER PUBLICATIONS

Notification of Reasons for Refusal issued Dec. 3, 2024 in the JP Patent Application No. 2021-162748.

* cited by examiner

*Primary Examiner* — Kevin E Yoon
(74) *Attorney, Agent, or Firm* — CKC & PARTNERS CO., LLC

(57) ABSTRACT

To provide a battery module capable of applying a uniform surface pressure to a stack. Provided is a battery module including: a cell stack in which solid battery cells are stacked; end plates that are disposed at both ends of the cell stack in a stacking direction; and pressurizing plates that are fastened to the end plates on an outer side of the end plates in the stacking direction, the pressurizing plates abutting on the end plates at a plurality of load points.

3 Claims, 7 Drawing Sheets

BATTERY MODULE

This application is based on and claims the benefit of priority from Japanese Patent Application No. 2021-162748, filed on 1 Oct. 2021, the content of which is incorporated herein by reference.

BACKGROUND OF THE INVENTION

Field of the Invention

The present invention relates to a battery module.

Related Art

In order to cause a battery module that serves as a power source of an electric vehicle or the like to appropriately function, it is necessary to apply a pressure in a stacking direction to stacked battery cells and to pressurize the battery cells. In particular, it is necessary to apply a much higher pressure to a solid secondary battery using a solid electrolyte as an electrolyte than to a liquid secondary battery using a liquid electrolyte. As a pressurization method, there is a method of bonding end plates and side plates to end surfaces and side surfaces of a stack of battery cells on both sides in a state in which the stack is initially pressurized from the end surfaces of the stack on both sides.

According to the aforementioned pressurization method, it is necessary to apply a higher initial pressure than a target pressure to the stack. Also, since an elastic modulus in the stacking direction of the stack varies, there is a problem that a residual load is hot uniform. Moreover, as a result of a necessity of strength and rigidity of the end plates and the side plates, there is also a problem that a space for the members increases and occupancy of the battery cells in the battery module decreases. As a pressurizing method other than the above method, a technique of coupling a stack with the stack sandwiched with a pair of terminal members is disclosed (see Patent Document 1, for example).

Patent Document 1: Japanese Unexamined Patent Application, Publication No. 2019-220419

SUMMARY OF THE INVENTION

The technology disclosed in Patent Document 1 employs a configuration of increasing the area of a pressing surface of a part pressing a power storage element in order to make a localized force unlikely to be applied the power storage element. However, it is not possible to sufficiently uniformize a surface pressure to be applied to the stack with the above configuration.

The present invention was made in view of the above circumstances, and an object thereof is to provide a battery module capable of applying a uniform surface pressure to a stack.

(1) The present invention relates to a battery module including: a cell stack in which solid battery cells are stacked; end plates that are disposed at both ends of the cell stack in a stacking direction; and pressurizing plates that are fastened to the end plates on an outer side of the end plates in the stacking direction, the pressurizing plates abutting on the end plates at a plurality of load points.

According to the invention in (1), it is possible to provide a battery module capable of applying a uniform surface pressure to a stack.

(2) The battery module according to (1), in which at least two or more pressurizing plates are disposed in a direction that is orthogonal to the stacking direction.

According to the invention in (2), it is possible to further uniformize the surface pressure to be applied to the stack by the load points with respect to the stack being dispersed.

(3) The battery module according to (1) or (2), in which the pressurizing plates are fastened along with the end plates with a fastening member that fastens the end plates.

According to the invention in (3), it is possible to reduce manufacturing cost of the battery module by sharing the member for fastening the end plates with the pressurizing plates.

(4) The battery module according to any of (1) to (3), in which the plurality of load points are disposed at positions that are symmetric with reference to fastening portions between the end plates and the pressurizing plates in a view from the stacking direction.

According to the invention in (4), it is possible to stabilize a load to be applied to the stack.

(5) The battery module according to any of (1) to (4), in which the end plates include first inclined portions that are inclined inward in the stacking direction from the plurality of load points.

According to the Invention in (5), the end plates have a section including the load points as apexes, concentration of a load on the vicinity of the load points can thus be avoided, and it is thus possible to uniformize a surface pressure in a sectional direction.

(6) The battery module according to (5), in which the pressurizing plates include second inclined portions that are inclined along the first inclined portions.

According to the invention in (6), it is possible to dispose the member for fastening the pressurizing plates and the end plates in a space formed by the first inclined portions and the second inclined portions and thereby to reduce the size of the battery module.

DETAILED DESCRIPTION OF THE INVENTION

First Embodiment

A battery module according to a first embodiment of the present invention will be described with reference to FIGS.

[Cell Stack]

Figure 1:
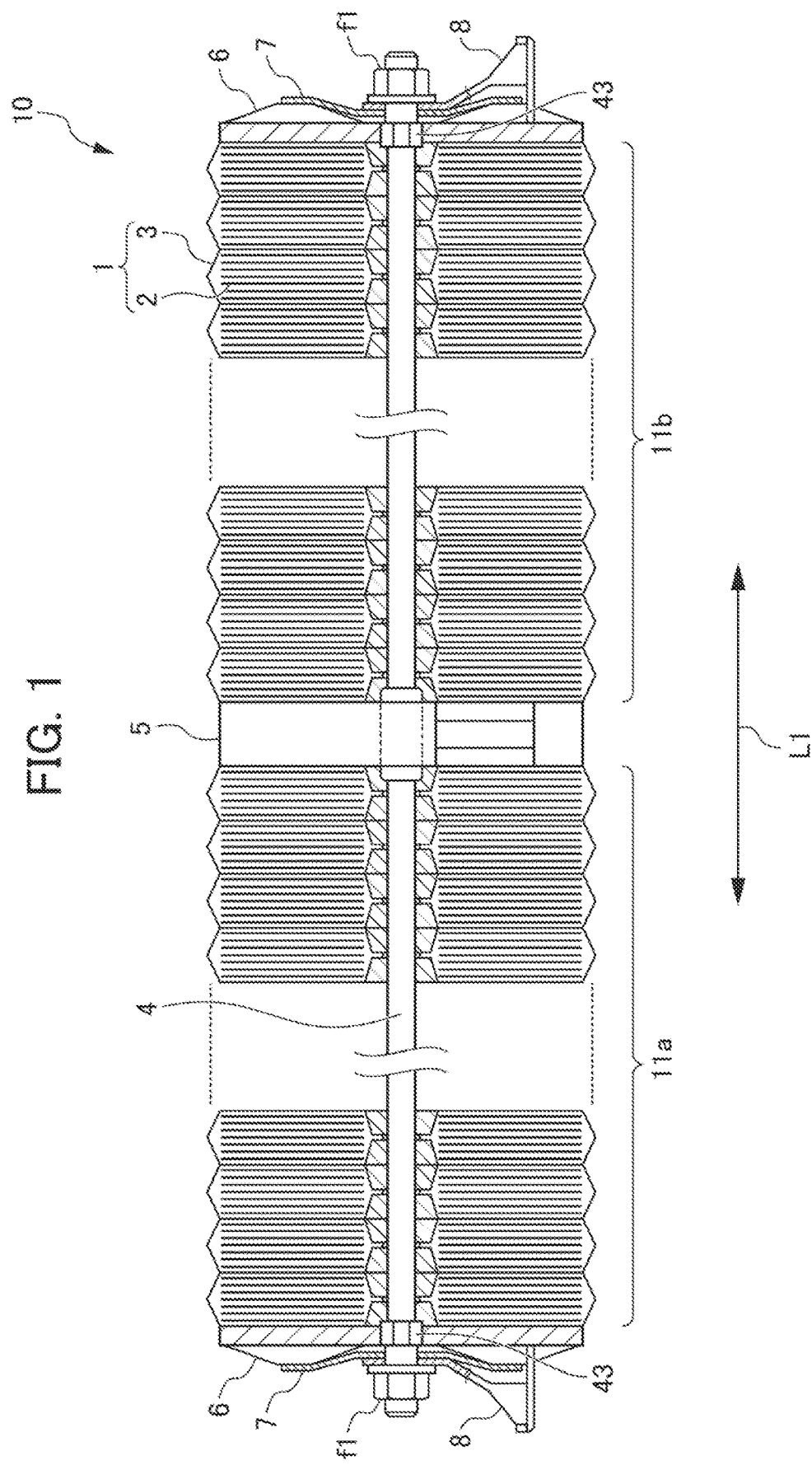
FIG. 1 is a partial sectional view illustrating a battery module according to a first embodiment of the present invention in a side view.

A battery module 10 according to the first embodiment includes cell stacks 11a and 11b in which a plurality of battery cells 1 including power generation elements 2 and exterior bodies 3 that cover the power generation elements 2 are stacked as illustrated in FIG. 1. The power generation elements 2 are solid batteries in which positive electrode layers, solid electrolyte layers, and negative electrode layers are repeatedly stacked in this order, for example. Although the following description will be given on the assumption that the power generation elements 2 are solid batteries, the power generation elements 2 may be electrolyte solution-based batteries including liquid electrolytes. The battery module 10 includes, in addition to the above components, a fastening member 4, a center securing member 5, end plates 6, pressurizing plates 7, stays 8, and fastening nuts f1.

As a material constituting the positive electrode layers, the solid electrolyte layers, and the negative electrode layers in the power generation elements 2, it is possible to use a material known as a material constituting a solid battery.

The exterior bodies 3 accommodate the power generation elements 2 therein. Although the exterior bodies 3 are not particularly limited, the exterior bodies 3 are preferably lamination films. It is possible to reduce the volume of the exterior bodies 3 by constituting the exterior bodies 3 as lamination films and thereby to improve energy density of the battery module. The lamination films have multilayer structures in which thermally fusion-bonding resin layers such as polyolefin are stacked on the outer side of metal layers made of aluminum, stainless steel (SUS), or the like, for example. It is also possible to use metal cans as the exterior bodies 3.

The plurality of battery cells 1 are stacked in the same direction (the stacking direction L1 illustrated in FIG. 1) as the stacking direction of the electrode layers constituting the power generation elements 2 and thereby constitute the cell stacks 11a and 11b. The cell stacks 11a and 11b are sandwiched with a pressure and held by the end plates 6 from both end sides in the stacking direction L1.

Figure 2:
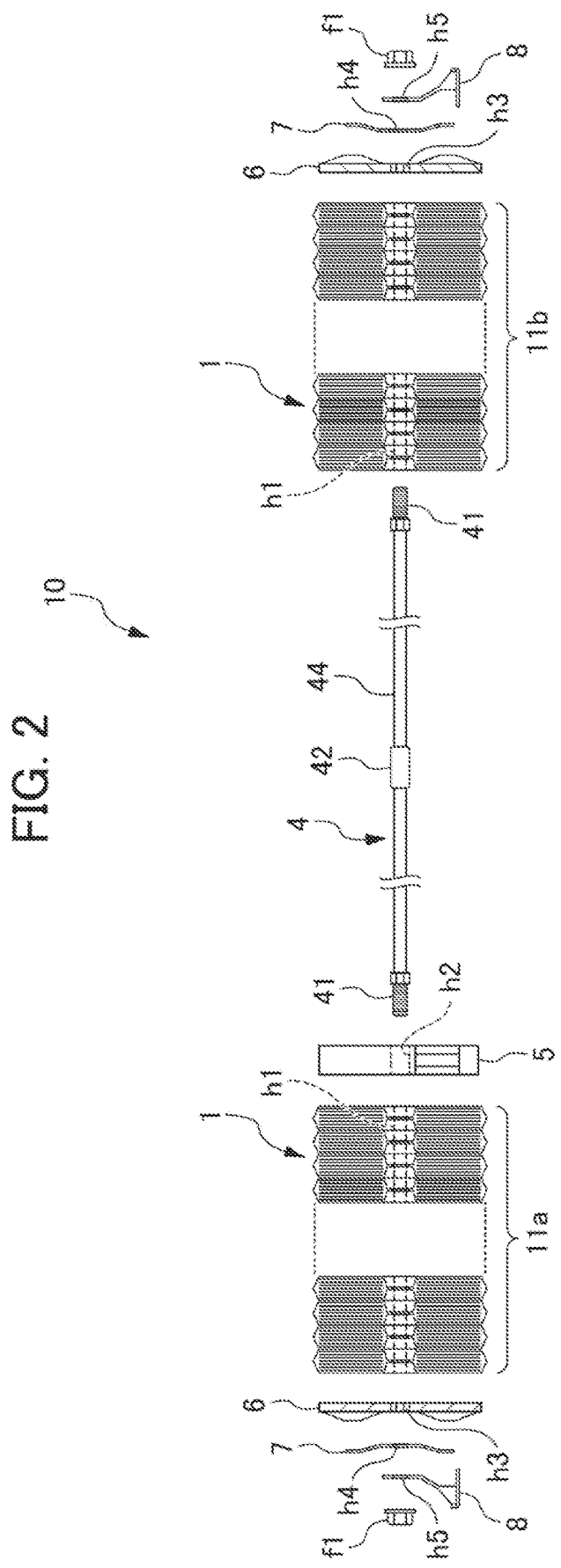
FIG. 2 is an exploded view illustrating a structure of the battery module in FIG. 1.

Each of the plurality of battery cells 1 is provided with a first through-hole h1 (which may be simply referred to as a "through-hole h1" below) in a direction in which it penetrates through each electrode layer constituting the power generation elements 2, at the center portion in a section in the up-down direction along the stacking direction L1, as illustrated in FIG. 2. The through-holes h1 are hole portions that penetrate through the battery cells 1 including the exterior bodies 3. Although the shape of the through-holes h1 is not particularly limited, the through-holes h1 preferably have a circular sectional shape that is similar to the sectional shape of the fastening member 4, which will be described later. As a method for forming the through-holes h1, it is possible to form the through-holes h1 by forming stacks with through-holes opened in each electrode layer and each solid electrolyte layer constituting the power generation elements 2, sealing the stacks in the exterior bodies 3, bonding the exterior bodies 3 at locations corresponding to the through-holes through welding of the laminate films, and forming through-holes that are slightly smaller than the above through-holes on the inner circumferential side of above the through-holes through punching, for example.

The plurality of battery cells 1 are disposed such that each through-hole h1 communicates with each other, and the fastening member 4 that fastens the cell stacks 11a and 11b is disposed in the through-holes h1, A pair of end plates 6 are fastened with the fastening member 4 in a direction in which the interval therebetween is narrowed. It is thus possible to pressurize the cell stacks 11a and 11b without performing initial pressurization (pre-pressurization) thereon.

[Fastening Member]

The fastening member 4 includes a shaft portion that serves as a main body; male screw portions 41 formed at both ends of the shaft portion, a diameter expansion portion 42 formed at the center portion in the axial direction, and rotation stopper portions 43 that are disposed between the male screw portions 41 and the shaft portion. The diameter expansion portion 42 is disposed in a second through-hole h2 in the center securing member 5, which will be described later. The fastening member 4 is screwed into the fastening nuts f1 with the shaft portion thereof inserted into the through-holes h1 of the cell stacks 11a and 11b and with the male screw portions 41 extending from hole portions h3, h4, and h5 provided in the end plates 6, the pressurizing plates 7, and the stays 8, respectively, at both end portions of the cell stacks 11a and 11b. The sectional shape of the fastening member 4 is preferably a circular shape from a viewpoint of obtaining a uniform sectional stress.

It is possible to uniformize a surface pressure to be applied to the cell stacks 11a and 11b by causing the fastening member 4 to be inserted into the through-holes h1 provided at the center portions in the stack surfaces of the cell stacks 11a and 11b and pressurizing the cell stacks 11a and 11b using a pair of end plates 6 and fastening nuts f1. Also, since it is not necessary to provide an outer frame for securing the cell stacks, and it is possible to improve a volume ratio of the power generation elements 2 in the battery module 10, it is possible to improve energy density of the battery module 10.

The rotation stopper portions 43 are disposed inside hole portions h3 formed in the end plates 6 in the vicinity of the fastening huts f1 as illustrated in FIG. 1. The rotation stopper portions 43 are members having a polygonal shape or a saw-tooth shape in a sectional view in the axial direction, for example. The rotation stopper portions 43 may be formed integrally with the fastening member 4 or may be configured as members that are separated from the fastening member 4 and may be firmly fixed to the fastening member 4.

The rotation stopper portions 43 have a function of receiving a torsional stress in the axial direction of the fastening member 4 by being fitted into the hole portions h3 formed in the end plates 6 and having an inner surface shape corresponding to the sectional shape of the rotation stopper portions 43, for example. In this manner, the torsional stress generated when the male screw portions 41 are screwed into the fastening nuts f1 is transmitted only to the male screw portions 41 of the fastening member 4 and the rotation stopper portions 43 and is not transmitted from the rotation stopper portions 43 o the inner side of the cell stacks 11a and 11b. It is thus possible to prevent loosening of the fastening nuts f1 during use of the battery module 10 over a long period of time. Additionally, it is possible to apply a larger axial force to the fastening member 4 through fastening of the fastening nuts f1, In addition to the above effect, it is possible to finely adjust the surface pressure to be applied to the cell stacks 11a and 11b depending on a degree of fastening of the fastening nuts f1.

The diameter of the shaft portion 44 of the fastening member 4 illustrated in FIG. 2 in the section in the axial direction can be designed in accordance with the surface pressure to be applied to the cell stacks 11a and 11b. Since a stress per unit area to be applied to the shaft portion 44 increases by reducing the diameter, it is possible to reduce an elastic modulus with which the end plates 6 are held in a direction of compressing the distance therebetween and to reduce a width of a change in surface pressure to be applied to the cell stacks 11a and 11b.

[Center Securing Member]

The center securing member 5 is a member disposed between the plurality of battery cells 1 and is a member disposed at the center of the battery module 10 in the stacking direction L1 as illustrated in FIG. 1. The surface pressure to be applied to the cell stacks 11a and 11b is uniformized in the stacking direction L1 by the center securing member 5. The center securing member 5 receives only a compressing force in the stacking direction L1 and can thus be constituted by light-weight metal such as aluminum, for example.

The center securing member 5 is provided with a second through-hole h2 (which may be simply referred to as a "through-hole h2" below) in which the diameter expansion portion 42 of the fastening member 4 is disposed. As illustrated in FIG. 2, the center securing member 5 is disposed such that the through-hole h2 communicates with the through-holes h1. The through-hole h2 may be able to be secured to the diameter expansion portion 42 in a surface that is vertical to the axial direction through spigot joint or the like. It is thus possible to position and secure the center securing member 5 and the fastening member 4 and to easily dispose the center securing member 5 at the center of the battery module 10 in the stacking direction L1.

[End Plate]

The end plates 6 are a pair of members disposed at both ends of the cell stacks 11a and 11b in the stacking direction L1. The hole portions h3 into which the fastening member 4 can be inserted are formed in the end plates 6 as illustrated in FIG. 2. The end plates 6 sandwich the cell stacks 11a and 11b with a pressure and hold them by the fastening member 4 being inserted into the hole portions h3 and fastened with the fastening nuts f1.

Figure 3:
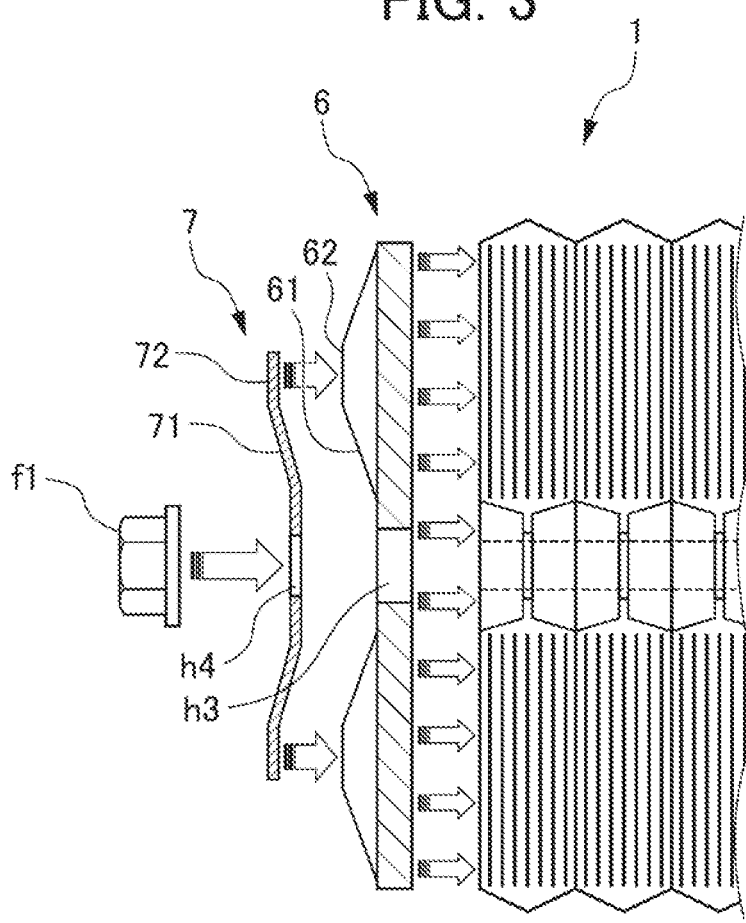
FIG. 3 is a diagram illustrating main components in FIG. 2 in an enlarged manner.

The end plates 6 include inclined portions 61 that serve as the first inclined portions and load points 62 as illustrated in FIG. 3. The inclined portions 61 are inclined from the load points 62 toward the side of the cell stacks 11a and 11b that are an inner side in the stacking direction E1.

The load points 62 are surfaces that are continuous with the inclined portions 61 and are surfaces that are substantially vertical to the stacking direction L1. The end plates 6 are in contact with the pressurizing plates 7 at the plurality of load points 62. In this manner, the surface pressure to be applied from the end plates 6 to the cell stacks 11a and 11b is uniformized with respect to the stacked surfaces.

Although a material of the end plates 6 is not particularly limited, it is preferable to use light-weight metal, and aluminum is used, for example. It is thus possible to manufacture the end plates 6 by a known method such as extrusion molding, which is advantageous in terms of manufacturing cost and working accuracy as compared with a case in which other metal is used.

[Pressurizing Plate]

The pressurizing plates 7 are a pair of members fastened along with the end plates 6 with the fastening nuts f1. The pressurizing plates 7 are disposed outside both ends of the cell stacks 11a and 11b in the stacking direction L1 in the stacking direction L1 of the end plates 6, The pressurizing plates 7 are elastically deformable members and are members with a plate spring shape made of metal, for example. Hole portions h4 into which the fastening member 4 can be inserted are formed in the pressurizing plates 7 as illustrated in FIG. 2. The axial force generated by fastening of the fastening nuts f1 is transmitted to the end plates 6 via the pressurizing plates 7 by the fastening member 4 being inserted into the hole portions h1 and fastened with the fastening nuts f1.

The pressurizing plates 7 include inclined portions 71 that serve as second inclined portions and load points 72 as illustrated in FIG. 3. The inclined portions 71 are surfaces inclined along the inclined portions 61. It is possible to secure spaces where the fastening nuts f1 are disposed at the centers of the stacking end surfaces of the cell stacks 11a and 11b by the inclined portions 71 being inclined along the inclined portions 61. In this manner, it is possible to configure the battery module 10 without the fastening nuts f1 projecting from the end surfaces and thereby to reduce the size of the battery module 10. Also, it is possible to dispose the battery module 10 without any waste space when the battery module 10 is disposed.

The load points 72 are surfaces that are continuous with the inclined portions 71 and are surfaces that are substantially vertical to the stacking direction L1. The plurality of load points 72 are provided to abut on the end plates 6. Details of the configuration of the pressurizing plates including the load points 72 will be describe as a configuration of a second embodiment, which will be described later.

[Stay]

The stays 8 are a pair of members that are fastened along with the end plates 6 and the pressurizing plates 7 with the fastening nuts f1. The stays 8 are members for securing the cell stacks 11a and 11b. The stays 8 are disposed outside both ends of the cell stacks 11a and 11b in the stacking direction L1 outside the pressurizing plates 7 in the stacking direction L1. Hole portions h5 into which the fastening members 4 can be inserted into the stays 8 as illustrated in FIG. 2. The fastening member 4 is inserted into the hole portions h5 and is fastened with the fastening nuts f1. It is possible to reduce installation spaces for the stays 8 and the number of components by using the fastening member 4 to secure the stays 8. Details of a configuration of the stays 8 will be described below in a second embodiment.

Second Embodiment

Figure 8:
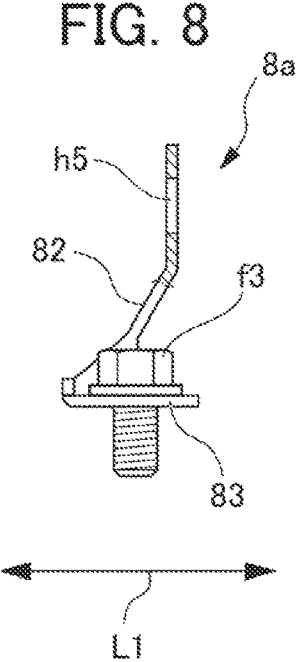
FIG. 8 is a diagram of main components of the battery module in FIG. 7 in a view from a side surface.

Next, the second embodiment of the present invention will be described with reference to FIGS. 4 and 8. The same reference signs may be applied to configurations that are similar to those in the above first embodiment in the drawings, and the description thereof may be omitted.

Figure 4:
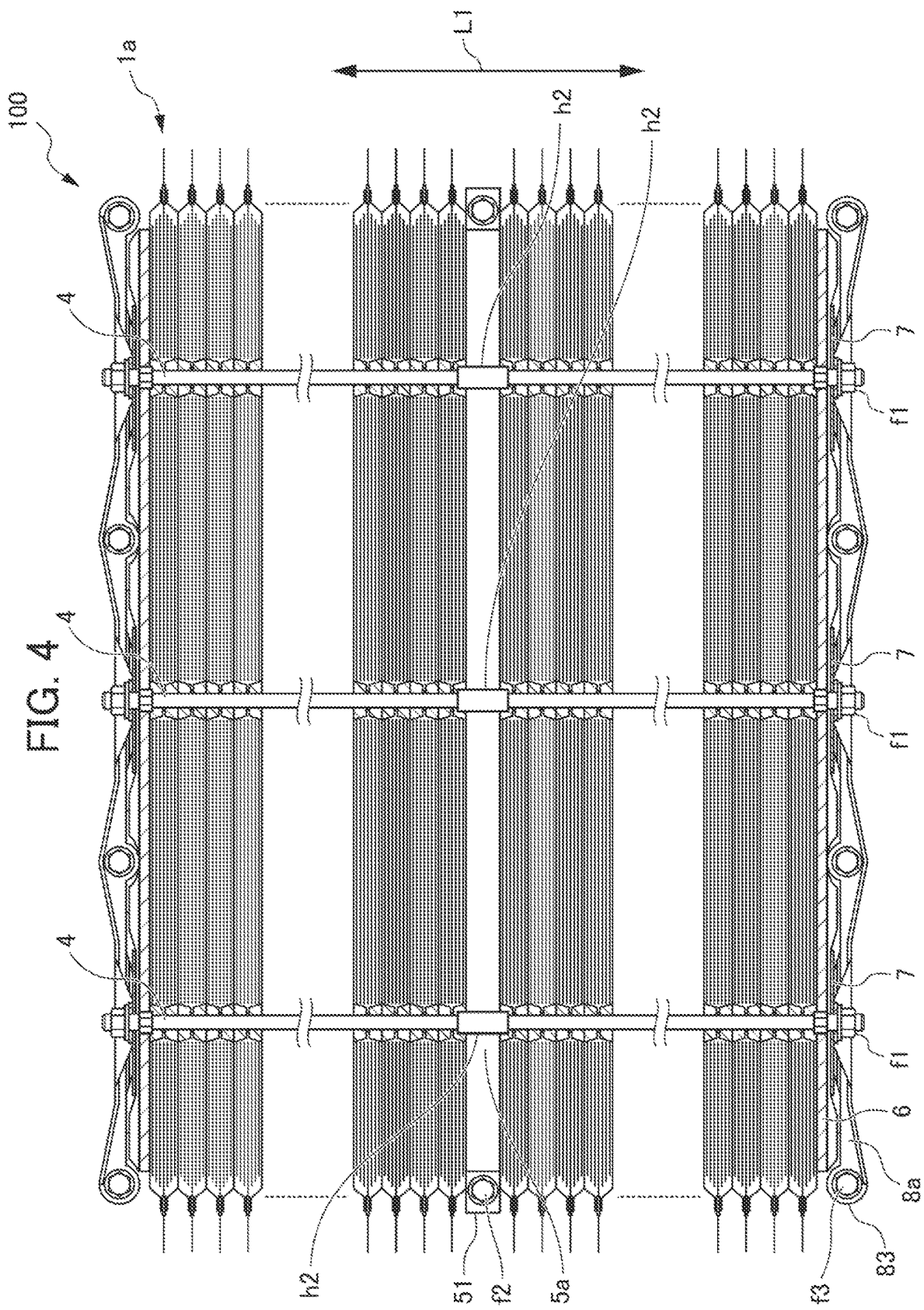
FIG. 4 is a partial sectional view illustrating a battery module according to a second embodiment of the present invention in a top view.
Figure 5:
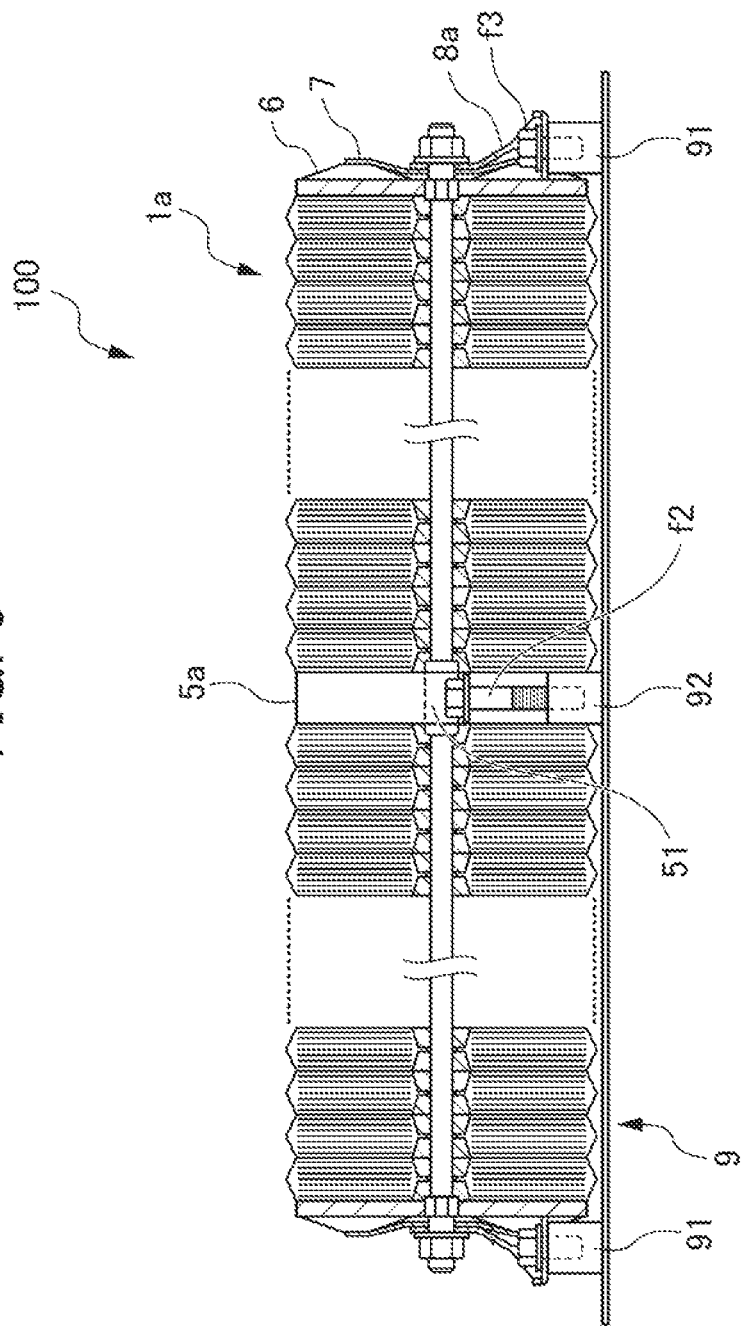
FIG. 5 is a partial sectional view illustrating the battery module in FIG. 4 in a side view.

FIG. 4 is a top view of a battery module 100 according to the second embodiment. The battery module 100 is a larger battery module obtained by combining the battery modules 10. As illustrated in FIGS. 4 and 5, a plurality of hole portions are formed at center portions of sections of a plurality of battery cells 1a in the up-down direction along the stacking direction L1, and a plurality of fastening members 4 (three in the present embodiment) are inserted into and disposed in the hole portions. The number of disposed fastening members 4 is not limited the above number and may be two or four, for example. The battery module 100 includes a case 9 that accommodates the stacks of the battery cells 1a as illustrated in FIGS. 5 and 6.

A center securing member 5a according to the present embodiment includes a plurality of through-holes h2 into which the fastening members 4 are inserted. Also, the center securing member 5a includes a coupling portion 51 for coupling to the case 9. The center securing member 5a and the case 9 are coupled to the coupling portion 51 with a fastening bolt f2 screwed thereinto. It is thus possible to further enhance rigidity of the stacks of the battery cells 1a.

[Pressurizing Plate]

Figure 6:
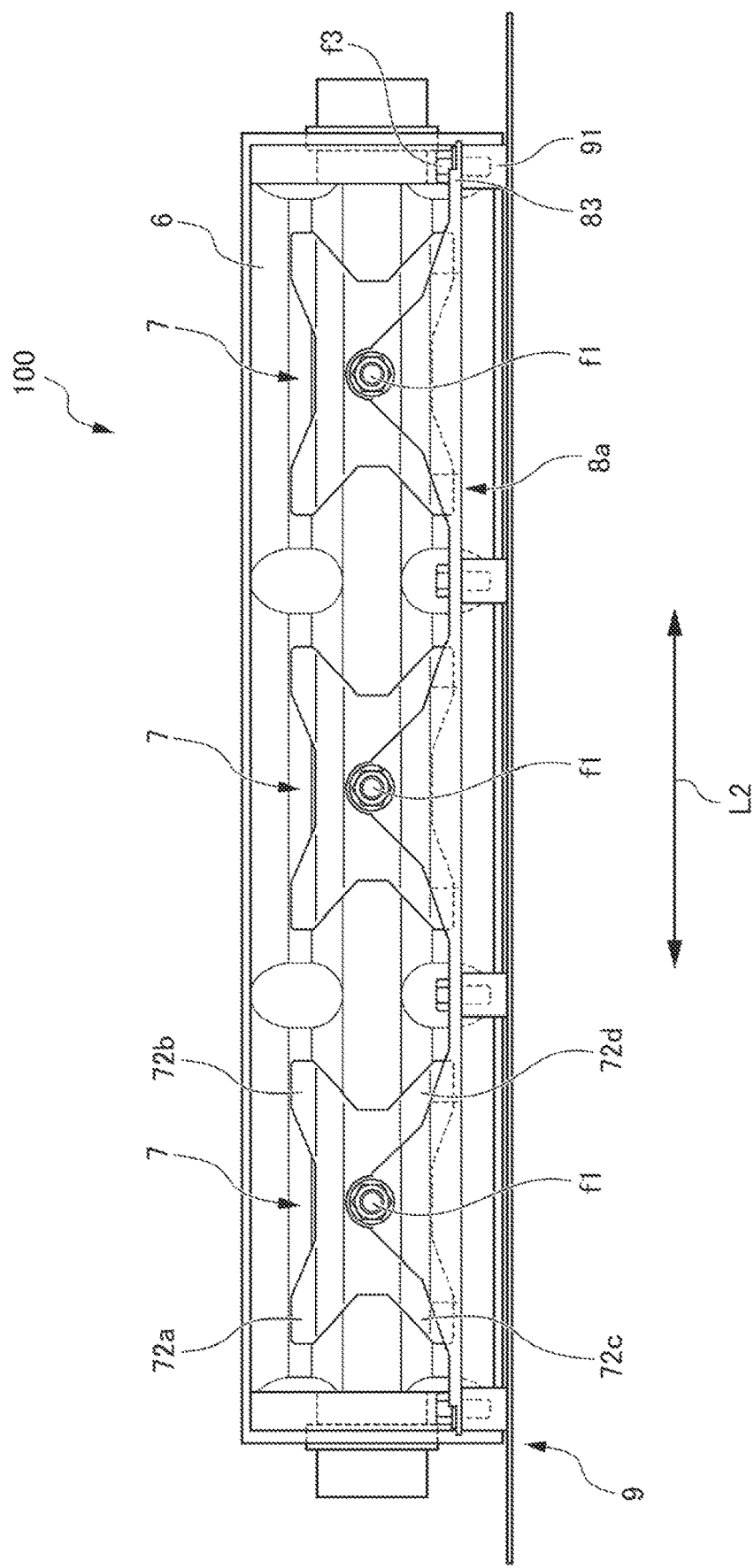
FIG. 6 is a diagram of the battery module in FIG. 4 in a view from one stacking direction side.

Two or more pressurizing plates 7 according to the present embodiment are preferably stacked in a direction L2 that is a direction that is orthogonal to the stacking direction L1 as illustrated in FIG. 6. In this manner, it is possible to increase the load points between the end plates 6 and the pressurizing plates 7, the load is dispersed, and it is possible to further uniformize the surface pressure to be applied to the stacks of the battery cells 1a. In the present embodiment, three pressurizing plates 7 are disposed in the direction L2.

The plurality of load points 72 at which the pressurizing plates 7 abut on the end plates 6 are preferably disposed at a plurality of positions that are symmetric with reference to the fastening nuts f1. In this manner, it is possible to stabilize the surface pressure to be applied to the stacks of the battery cells 1a. In the present embodiment, the plurality of load points 72 are disposed at four positions that are symmetric with reference to each fastening nut f1. The load points 72a and 72d and the load points 72b and 72c are disposed at target positions in directions that are oblique to the up-down direction of the battery module 100 with each fastening nut f1 sandwiched therebetween. The load points may be increased in number by providing additional members between the pressurizing plates 7 and the end plates 6. The additional members are constituted as elastically deformable members that are disposed at the positions corresponding to the plurality of load points 72, respectively, and having a plurality of parts abutting on the end plates 6, for example.

The shape of the pressurizing plates 7 is not particularly limited as long as the shape includes the plurality of load points, and may be an X shape in a view from the stacking direction L1 as illustrated in FIG. 6, or may be an arbitrary shape such as a circular shape or a polygonal shape.

Figure 7:
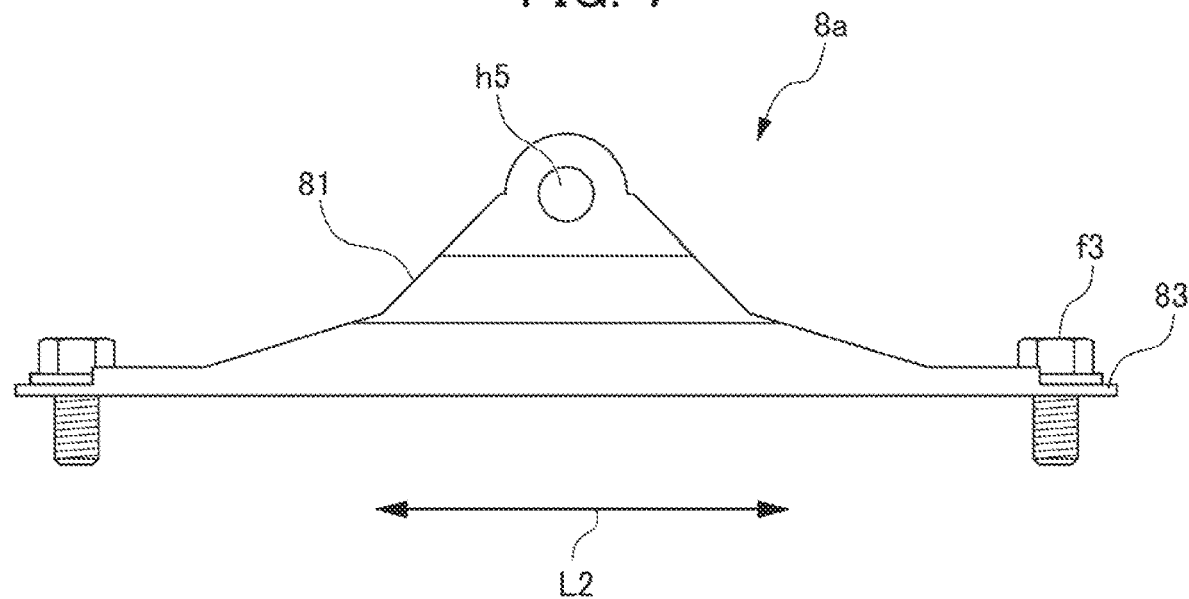
FIG. 7 is a diagram of the battery module in FIG. 4 in a view from the one stacking direction side.

Stays 8a according to the present embodiment includes Coupling portions 83 for coupling to the case 9 between both ends of the direction L2 that is orthogonal to the stacking direction L1 and/or fastening members 4 as illustrated in FIGS. 6 and 7. The stays 8a and the case 9 are coupled by the fastening bolts f3 being screwed into the coupling portions 83. It is thus possible to further enhance rigidity of the stacks of the battery cells 1a. Also, the stays 8a are constituted by elastically deformable members and have rigidity in the stacking direction set to be lower than rigidity in the direction that is orthogonal to the stacking direction L1. The stays 8a can thus absorb displacement of the battery cells 1a that accompanies expansion and contraction of the stacks.

FIG. 7 is a view of a part of the stay 8a disposed on a side of a stacking end of the battery module 100 seen from the same point of view as that in FIG. 6 in the stacking direction L1. As illustrated in FIG. 7, the stay 8a includes an inclined portion 81 that is inclined in a direction spreading downward in a view from the stacking direction L1. Also, as illustrated in FIG. 8, the stay 8a includes an inclined portion 82 that is inclined downward from the hole portion h5 that is a part fastened to the fastening nut f1 toward the outer side in the stacking direction L1. With the above configuration, the stay 8a can absorb displacement of the battery cells 1a that accompanies expansion and contraction of the stacks through deflection deformation in the stacking direction L1. On the other hand, the rigidity with respect to the stacking surfaces of the battery cells 1a is high, and it is possible to suitably secure the stacks of the battery cells 1a.

Although the preferred embodiments of the present invention have been described hitherto, the present invention is not limited to the above embodiment and can be appropriately modified.

The above embodiments have been described on the assumption that the rotation stopper portions 43 are fitted into the hole portions h3 formed in the end plates 6, for example, and having an inner surface shape corresponding to the sectional shape of the rotation stopper portions 43. The present invention is not limited thereto. The rotation stopper portions 43 may be provided at end portions of the male screw portions 41 to secure the end portions of the male screw portions 41.

The above embodiments have been described on the assumption that the hole portions h5 into which the fastening member 4 can be inserted are formed and the stays 8 and Ba are fastened with the fastening nuts f1. The present invention is not limited thereto. The stays in the present invention may be coupled to the pressurizing plates at one location or a plurality of locations.

EXPLANATION OF REFERENCE NUMERALS 10, 100 Battery module
1, 1a Battery cell
11a, 11b Cell stack
4 Fastening member
6 End plate
61 First inclined portion
7 Pressurizing plate
71 Second inclined portion
72 Load point
L1 Stacking direction

What is claimed is:

1. A battery module comprising:
a cell stack in which solid battery cells are stacked;
end plates that are disposed at both ends of the cell stack in a stacking direction; and
pressurizing plates that are fastened to the end plates on an outer side of the end plates in the stacking direction,
wherein the pressurizing plates abut on the end plates at a plurality of load points,
the pressurizing plates are fastened along with the end plates with a fastening member that fastens the end plates to each other,
the end plates include first inclined portions that are inclined from the plurality of load points toward the cell stack,
the pressurizing plates include second inclined portions that are inclined along the first inclined portions, and
the fastening member is disposed between the first inclined portions and between the second inclined portions.

2. The battery module according to claim 1, wherein at least two or more pressurizing plates are disposed in a direction that is orthogonal to the stacking direction.

3. The battery module according to claim 1, wherein the plurality of load points are disposed at positions that are symmetric with reference to fastening portions between the end plates and the pressurizing plates in a view from the stacking direction.

* * * * *